Nov. 19, 1940.   C. E. SNIDER   2,221,929
BRAKING APPARATUS FOR TRAILER VEHICLES
Filed April 21, 1939
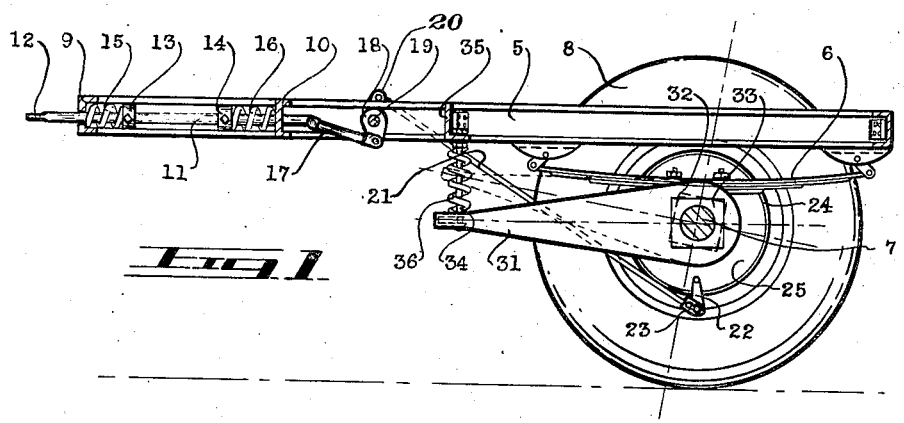
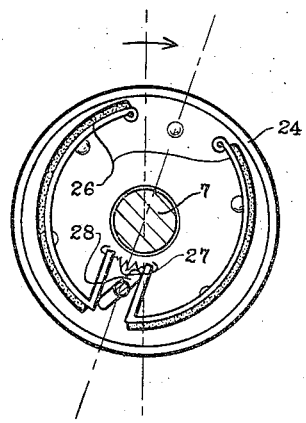
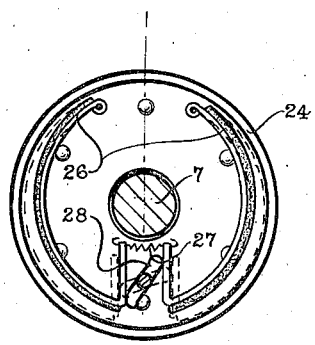
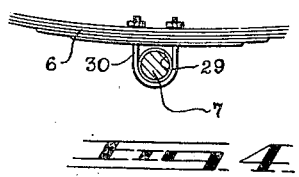
Inventor
CHARLES E. SNIDER
By W. Irwin Haskett
Attorney.

Patented Nov. 19, 1940

2,221,929

UNITED STATES PATENT OFFICE 2,221,929

BRAKING APPARATUS FOR TRAILER VEHICLES

Charles Edward Snider, Woodbridge, Ontario, Canada

Application April 21, 1939, Serial No. 269,123

4 Claims. (Cl. 188—142)

This invention relates to improvements in or relating to braking apparatus for trailer vehicles and appertains particularly to a device of this nature wherein the thrust pressure or over-run, that results when the towing vehicle is decelerated, automatically brings the trailer brake mechanism into operation, releasing the same when the towing vehicle pulls ahead again.

The principal object of the invention is the provision of a trailer brake that is entirely automatic in its operation, even to the release of the brake when backing up.

A further object of the invention is the provision of an automatic trailer brake mechanism wherein the thrust resulting from the momentum of the trailer, as it attempts to close in on the towing vehicle, is communicated through sundry mechanisms to the usual brake rod and brake, characterized in that the trailer axle and affixed brake carrying disk is allowed a rotative movement, within controlled limits, whereby the same may turn backwards through a small angle, when the trailer is backed up, sufficient to cancel or offset the brake applying movement of the brake rod and automatically cause the release of the said brakes.

A still further object of the invention is to provide braking apparatus for a trailer of the nature and for the purpose described that is efficient, dependable and automatic in operation, adjustable to assure smooth cushioned application of the brakes, and, being capable of manufacture at reasonable cost is thereby rendered commercially desirable.

To the accomplishment of these and related objects as shall become apparent as the description proceeds, the invention resides in the construction, combination and arrangement of parts as shall be hereinafter more fully described, illustrated in the accompanying drawing and pointed out in the claims hereunto appended.

The invention will be best understood and can be more clearly described when reference is had to the drawing forming a part of this disclosure, wherein like characters indicate like parts throughout the several views.

In the drawing:

Figure 1 is a vertical longitudinal section of a simple embodiment of my invention;

Figure 2 is an enlarged transverse section through the brakes and showing the same applied in dotted outline;

Figure 3 is a similar sectional view showing the brakes released on being rocked backwards; and Figure 4 is a detail of the rotatable mounting of the axle relative to the springs.

The trailer is here shown as having a frame 5, springs 6, axle 7 and wheels 8. A pair of longitudinally spaced cross frame members 9 and 10 respectively, at or near the front of the frame 5, serve to slidingly support the draw bar 11 whose front end 12 is designed for detachable engagement with a towing vehicle. Intermediate the cross frame members 9 and 10 this bar carries two adjustable collars 13 and 14 and between the former and the front cross frame member 9 is a coil spring 15 and between the latter and the other cross frame member 10 is another coil spring 16. Thus the forward tug and rear thrust of this draw bar 11 are both spring cushioned.

From the rear of the draw bar 11 a link 17 connects to an arm 18 that is rigid on a transverse rocking shaft 19 on the outer ends of which other arms 20 are fastened. These latter each carry a brake rod 21 engaging the usual brake applying arm 22 at their rear ends. These rods 21 may be slotted, as shown at 23, where they attach to the brake arm 22 so that the forward pull on the draw bar 11 against the compression of the spring 15 will not affect the brakes but on the rearward thrust of the draw bar, as the trailer attempts to overrun the tow car, the brake rods 21 will pull the brake applying arms 22 forwardly applying the brakes.

The particular structure per se of the brakes here shown does not constitute a part of this invention but rather is to be considered as incidental thereto. These brakes are shown as comprising an open-sided drum housing 24 carried on and rotatable with the wheel 8, a disk 25, normally closing the open side of said drum, fixed on the axle 7 that is normally non-rotatable. On this disk are mounted a pair of spreadable brake bands 26 normally contracted by a spring 27 and movable into frictional engagement with said brake drum 24 by a double cam 28 operated by the brake arm 22.

As backing up would lock the trailer brakes, an automatic release mechanism is provided. The axle 7 is surrounded by a sleeve 29 where it is clamped to the springs 6 by the U-bolt 30 thus allowing it to rotate. Such rotation, however, is limited by a tongue 31 that has a square opening 32 to accommodate a squared portion 33 of the axle 7 so that the said parts are relatively non-rotatable. The forward end of this tongue is perforated to receive a bolt 34 whose upper end is vertically adjustable in a frame cross bar 35 and about this bolt between tongue and cross bar a compression coil spring 36 is mounted. Thus when the tow car backs up on the trailer, the brakes are applied coupling the brake disk 25 and housing 24 and as the latter turns backwards the former rotates the axle 7 clockwise moving the tongue against the action of the spring 36 until the brake applying arm 22 moves toward or against the forward end of the slot 23 and presses sufficiently against this end of the rod 21 to cause the releasing of the brake.

From the foregoing description taken in connection with the accompanying drawing it will be manifest that a braking apparatus for trailer vehicles is provided that will fulfil all the necessary requirements of such a device but as many changes could be made in the above description and many apparently widely different embodiments of the invention may be constructed within the scope of the appended claims without departing from the spirit or scope thereof, it is intended that all matters contained in the said accompanying specification and drawing shall be interpreted as illustrative and not in a limitative or restrictive sense.

Having thus described the invention, what is claimed as new is:

1. In combination with a trailer, a draw bar slidably connected thereto, brake mechanism operatively connected with said draw bar, an axle for said trailer mounted for rotation with respect thereto, said brake mechanism including a brake disk mounting brake shoes, and a brake applying arm that are fixed for rotation with said axle, a tongue fixed to said axle so that it rotates therewith and means to limit the rotative movement of said tongue, whereby on "backing up" the rearward thrust on said drawbar communicated to said brake mechanism is nullified by the rearward rotation of said axle, within the limit allowed by said tongue.

2. For a trailer, brake mechanism, operative on the thrust of the draw bar when attempting to overrun the towing vehicle, including automatic release mechanism to permit backing up comprising a rotatably mounted axle, means for yieldingly limiting its rotation and a brake disk mounting brake shoes and a brake applying arm therefor on each end of said axle and reversely rotatable with said axle within the limit allowed, whereby the rearward thrust of said drawbar when backing up does not effect operation of the brake mechanism.

3. The combination with the structure set forth in claim 1, of springs on said drawbar to cushion both forward and rearward thrusts thereof, and tension adjusting means for each of said springs.

4. In combination with the structure set forth in claim 2, wherein said means comprises a squared portion on said axle, a tongue with a correspondingly shaped opening to accommodate said squared portion, a slidable rod connecting the free end of said tongue to the trailer and a coil spring compressed on said rod between said tongue and trailer.

CHARLES EDWARD SNIDER.